UNITED STATES PATENT OFFICE.

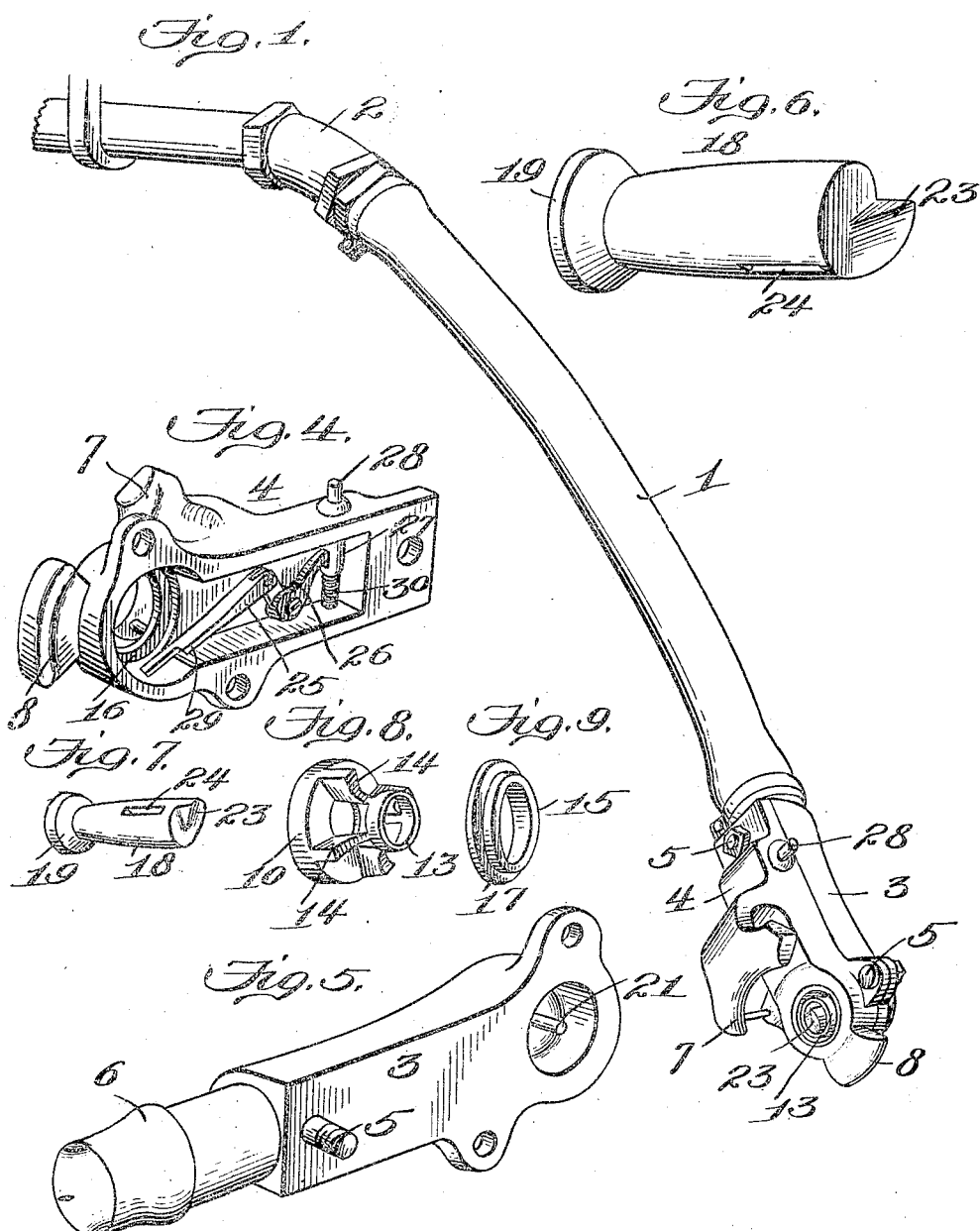

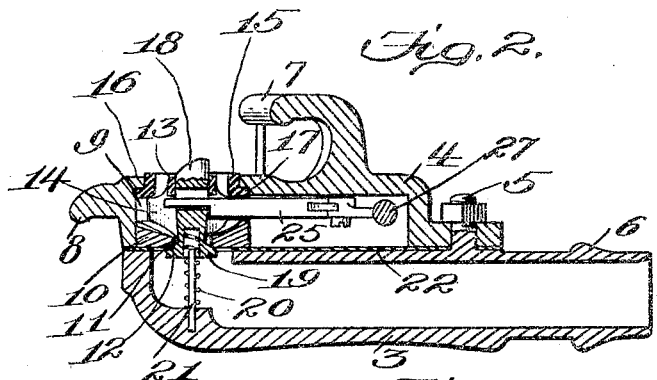
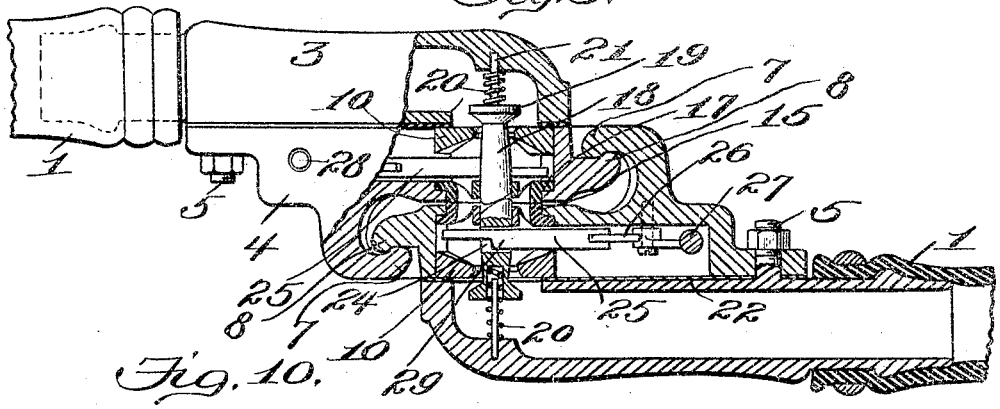
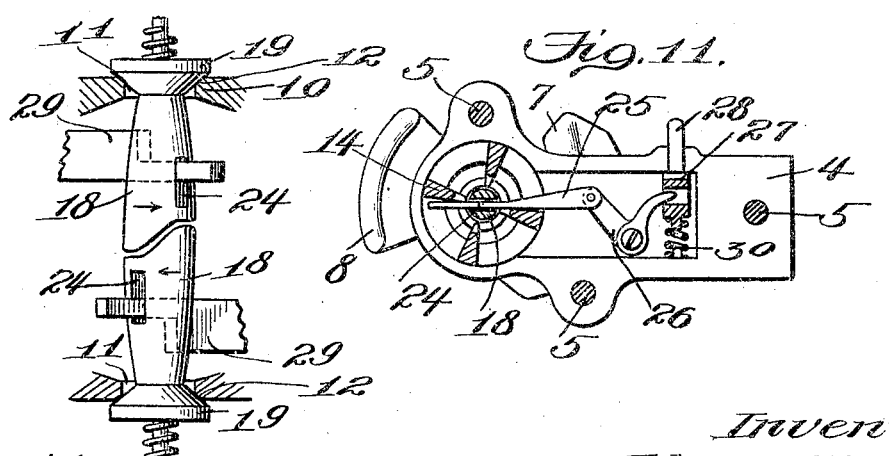

JOHN H. MOORE, OF LAMBERTVILLE, NEW JERSEY.

HOSE-COUPLING.

No. 917,474.        Specification of Letters Patent.        Patented April 6, 1909.

Application filed March 26, 1908. Serial No. 423,409.

To all whom it may concern:

Be it known that I, JOHN H. MOORE, a citizen of the United States, residing at Lambertville, in the county of Hunterdon and State of New Jersey, have invented new and useful Improvements in Hose-Couplings, of which the following is a specification.

My present invention relates to improvements in hose couplings and especially to that class employed for the purpose of connecting the air and steam hose on railway trains, and the primary object of the invention is to provide an improved coupling of this character wherein the cut-off valve which controls the flow of fluid from the train pipe on each car is opened automatically when the members of the coupling are properly joined.

Another object of the invention is to provide a coupling of this character wherein the usual angle cock may be dispensed with, an appropriate cut-off or controlling valve being inclosed within the head of the coupling member so that it cannot become accidentally or maliciously deranged, a fault which is inherent in the use of the angle cock.

Further objects of the invention are to provide a novel mode of mounting the automatic cut-off valve in the head of the coupling member, and to provide a device which will operate to retain the valve in open position should the members become accidentally uncoupled, so that when the couplings are used in connection with the train pipe of an air-brake system, the brakes will be automatically set should the coupling be broken by reason of the uncoupling of the cars or from other causes.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a hose connection equipped with a coupling member constructed in accordance with my present invention; Fig. 2 represents a central longitudinal section of the coupling member showing the valve in closed position; Fig. 3 is a sectional view of two coupling members in coupled relation; Figs. 4 and 5 are perspective views of the two component sections of the coupling head; Figs. 6 and 7 are perspective views of the controlling valve removed from the coupling member; Fig. 8 is a perspective view of the valve seat and guide for the valve stem; Fig. 9 is a perspective view of the packing ring or washer which coöperates with a similar washer on the other coupling member to provide a fluid-tight joint between them; Fig. 10 is an enlarged sectional view showing the relative positions of the valve members at the moment the coupling members are placed together and before rotation thereof into locked position; and Fig. 11 is a detail view of the valve detaining device.

Similar parts are designated by the same reference characters in the several views.

Hose couplings constructed in accordance with my present invention are capable of use generally in connecting hose in various instances, one embodiment of the invention being shown in the present instance as applied to the train pipe of an air-brake system.

Air-brake systems of the ordinary type are provided with an angle cock which is arranged at each end of the section of the train pipe carried by the car, this angle cock being turned manually into closed position when that particular end of the car is uncoupled, and when such end of the car is coupled to a train, it is necessary to open such angle cock in order to establish communication between the respective section of the train pipe and the locomotive. In some cases either through negligence or accident, this angle cock has been closed and consequently the brakes on all cars in rear of the closed angle cock could not be set by the engineer. The present invention provides a valve which dispenses with the use of the angle cock and its disadvantages, for according to the present invention, the final act of coupling the hose insures the proper opening of the controlling valves on the adjacent ends of both cars, and as the valves are concealed, the possibility of malicious tampering therewith is precluded.

In the present embodiment of my invention, the coupling head is attached to the free end of the usual hose connection 1, the latter being connected at its upper end to the usual train pipe 2. The coupling head may be made in any suitable manner, it being composed in the present instance of two component sections 3 and 4 which are secured together by means of bolts or suitable devices 5. The section 3 is provided with a longitudinal bore and a nipple 6 over which the hose 1 fits, and the section 4 is provided with devices which interlock with a coöperating coupling member. The coupling shown in the present instance is of the well known type wherein the members are coupled and uncoupled by a relative rotary movement on a transverse axis, the section 4 of each coupling member being provided with the usual cam-shaped lugs 7 and 8 which interlock in the well known manner with a corresponding pair of lugs of another coupling member, the cams on these lugs being of segmental form and serving to draw the coupling members together transversely. That face of each coupling member which engages a coöperating coupling member is provided with a chamber 9 which communicates with the bore of the section 3 and fitted into this chamber is a valve member 10 having a central air passage 11 and a conical valve seat 12 surrounding such passage. This valve member is provided with an annular guide 13 which is arranged centrally of the chamber 9 and is connected to the valve seat by means of radial ribs 14. The outer sides of these ribs serve as seats for a packing washer 15. The outer end of the chamber 9 is provided with an internal flange 16 through which a sleeve-like portion of the washer 15 extends, the washer having an inner peripheral flange 17 which rests upon the outer sides of the ribs 14 of the valve member and bears against the rear side of the internal flange 16.

A valve member 18 is mounted to reciprocate through the bore 11 of the valve seat and the guide 13 supported thereon, this valve member having a conical head 19 which coöperates with the seat 12, the valve head and seat being normally held in coöperative relation to confine air in the train pipe, by means of a helical compression spring 20 which surrounds a guiding stem 21 fixed in the coupling section 3 and serving as a guide for the valve member 18. It is generally preferable to construct the chamber 9 in the form of a cylinder which opens at the inner or lower face of the section 4, such a construction permitting the valve member 10 to be introduced into the section 4 while the latter is detached from the section 3, and by interposing a sheet of packing material 22 between these two sections and clamping the sections together, the lower side of the valve seat 10 bears upon this packing material to provide a fluid-tight joint, and the clamping together of the two sections also causes the ribs 14 to bear against the rear side of the washer 15 and thereby hold the latter tightly against the internal flange 16 as a seat.

The outer end of the valve member 18 is exposed within the washer 15, and is provided with a cam projection 23 which forms an incline extending diagonally of the axis of this valve member. This cam projection occupies such an angular position relatively to the coöperating locking lugs of the coupling members, that when the two coupling members are brought together, the cam projections on the respective valve members will be offset relatively to one another, as shown in Fig. 10, the two valves, however, at this time remaining closed so as to prevent the escape of air from the train pipes. When the coupling members, however, are rotated on a transverse axis in the usual manner to lock the coupling members, the valve members 18 of the respective couplings will be caused to rotate in reverse directions or in a direction indicated by the arrows in Fig. 10, and such movement of these valve members will cause the two cam projections to ride upon one another and thereby move the valve members inwardly in an axial direction, displacing the valve heads 19 from the respective valve seats 12, as shown in Fig. 3, thus establishing communication between the train pipes on the respective cars.

In order to prevent rotation of the valve members 18 relatively to the respective coupling heads, these members are preferably provided with transverse slots 24 through which a slide 25 operates transversely, this slide being pivotally attached at its free end to a bell-crank lever 26, and the latter is operatively connected to a plunger 27 having a push button 28 which operates through one side of the coupling member and is accessible for operation on the exterior thereof. The slide 25 has a reduced end which is considerably narrower than the length of the transverse slot 24 so that while this reduced portion of the slide rests in such slot, the respective valve member is free to close. A shoulder or thicker portion 29, however, is formed on this slide which, while it engages in the slot 24, will prevent closing movement of the valve member, and the normal tendency of the slide 25 is to carry this shouldered portion thereon into the slot 24 under the action of a compression spring 30 which operates upon the plunger 27. Ordinarily while the valve member 18 is in closed position, the shouldered end of the enlarged portion 29 of the slide will bear against one side of the valve member 18 and will thereby be held from entering the slot 24. After the valve member, however, has been moved inwardly to displace its valve head from the corresponding seat by the coupling of the two members, the enlarged portion 29 of the slide will spring into the slot 24, and will thus serve to lock the valve in open position. Should the coupling members become accidentally disconnected, the controlling valve will remain open, permitting air to escape from the train pipe and thereby set the brakes on the respective car or cars. However, the brakeman in uncoupling the members may depress the push button 28 which will cause the slide 25 to be retracted sufficiently to withdraw the enlarged portion 29 thereon from the slot 24 of the valve member 18, and as the coupling members are rotated to uncouple them, the cam projections 23 on the respective valve members will ride backwardly upon one another and thereby permit closing of the respective valves.

A hose coupling constructed in accordance with my present invention may be manipulated with the greatest facility, as the act of coupling serves to automatically open the cut-off valves on the respective cars. For this reason, the tendency toward accidents in operating trains, either through failure to open the usual hand operated angle cock, or the accidental closing thereof is eliminated. Moreover, as the valve is totally concealed after the members of the coupling have been locked, it is impossible to maliciously tamper therewith. The valve detaining device also acts automatically to retain the valve in open position and thus permit the escape of air from the train to set the brakes, should the coupling members become accidentally disconnected because of the uncoupling of the cars, although, by depressing the push button previous to the disconnection of the coupling members, the valves will automatically close when the coupling members are separated, and thus prevent setting of the brakes.

The invention is not necessarily limited in its application to hose couplings of the type shown wherein the members are locked and unlocked by a relative rotation on a transverse axis, although it is generally advantageous to apply the invention to couplings of such type, as these couplings conform to the rules prescribed by the railroad authorities, and are now used generally on all railroad equipment.

I claim as my invention:

1. A hose coupling comprising coöperating members adapted to be interlocked by a relative rotation, and cut-off valves mounted in the respective members and having mutually engaging cam portions for opening both valves after the members have been placed together and while said members are being finally locked.

2. A hose coupling comprising coöperating members adapted to be engaged and disengaged by a relative rotation, non-rotatable valves mounted in the respective members and having movable valve members and cam projections on said valves arranged to coöperate with one another during the relative rotation of the coupling members to axially displace and open the respective valves.

3. A hose coupling comprising coöperating members adapted to be locked by a relative rotation, valves fitted in the respective members and reciprocatory valve members arranged substantially in alinement with the axis of relative rotation of the coupling members and having cam portions thereon arranged to mutually engage one another for opening their respective valves by axial movements while said members are being rotated in one direction.

4. A hose coupling comprising coöperating members having means for locking them by a relative rotation of the members, non-rotatable cut-off valves mounted in the respective coupling members and having cam portions on their stems and arranged in alinement with one another, the cam portion of one valve being arranged to coöperate with the corresponding portion of the other valve to move both valves axially to open them when said members are rotated to lock them.

5. A hose coupling comprising a pair of members having means for locking them by a relative rotation, and a cut-off valve mounted in each of said members and having a cam portion on its stem which coöperates with a similar cam portion on the stem of the valve in the other coupling member to move said valve axially to open it during the relative rotation of the members.

6. A hose coupling comprising coöperating members having means for locking them when the members are relatively rotated on a transverse axis, valves fitted in the respective members, and movable valve members having coöperating cam portions arranged substantially in alinement with the axis of rotation of the coupling members for causing axial movements of said valves to open them when the coupling members are relatively rotated on said axis.

7. A hose coupling member having a fluid passage therein, a cut-off valve controlling said passage, a movable valve member adapted to coöperate with a part on another coupling member to open said valve, and a spring operated device released automatically by the opening movement of said valve for retaining said valve in open position after the coupling members have been disengaged, said device being provided with means for retracting it manually at the exterior of the coupling member.

8. A hose coupling comprising coöperating members having means for interlocking them, valves fitted in the respective members for controlling communication between them, valve members arranged to be operated by mutual engagement to open the respective valves when said coupling members are connected, and a device having a shouldered portion movable transversely of the axis of its respective valve and capable of retraction from the exterior of its respective coupling member for retaining its respective valve in open position.

9. A hose coupling comprising a pair of members provided with connecting means, valves in the respective members for controlling communication between them, means for opening said valves when the coupling members are connected, a device set automatically by the opening movement of its respective valve to retain said valve in open position, and means operable from the exterior of the respective coupling member for retracting said device and permitting closing of the valves when the coupling members are disconnected.

10. A hose coupling comprising a pair of members having means for connecting them, valves in said members for controlling communication between them, said valves having reciprocatory members provided with transverse slots, a slide movable transversely of its respective valve having a shouldered portion adapted to enter said slot and retain the valve member in open position, a spring for actuating said slide, and a device operable from the exterior of the member for retracting said slide to permit closing of its respective valve when the coupling members are disconnected.

11. A hose coupling comprising a pair of members having means for locking them when relatively rotated, valves fitted in the respective coupling members, and valve members arranged substantially in alinement with the axis of rotation of the coupling members and provided with mutually engaging cam projections arranged to coöperate to open the respective valves by axial movements when the coupling members are rotated.

12. A hose coupling member having segmental locking lugs thereon and provided with a fluid passage, a bushing fitted in said passage and provided with an annular portion forming a valve seat, a second annular portion in rear thereof and forming a guiding sleeve, and radially arranged ribs connecting said annular portions, a reciprocatory valve member provided with a head arranged to coöperate with said valve seat to prevent the escape of fluid from said coupling member, the valve member being guided in said sleeve and provided with an operating end arranged concentrically of said locking lugs, and a packing washer held in position by the ribs on said bushing and surrounding the said valve member.

In testimony whereof I have hereunto set my hand in presence of two subscribing witnesses.

JOHN H. MOORE.

Witnesses:
JOHN C. MOORE,
JOHN E. SCHENCK.